(12) United States Patent
Coombs

(10) Patent No.: US 6,805,826 B2
(45) Date of Patent: Oct. 19, 2004

(54) METHOD OF MAKING A STRAIN RELIEF

(75) Inventor: Richard L. Coombs, Boise, ID (US)

(73) Assignee: Pro-Team, Inc., Boise, ID (US)

( * ) Notice: Subject to any disclaimer, the term of this patent is extended or adjusted under 35 U.S.C. 154(b) by 55 days.

(21) Appl. No.: 10/108,936

(22) Filed: Mar. 26, 2002

(65) Prior Publication Data

US 2002/0102914 A1 Aug. 1, 2002

Related U.S. Application Data

(62) Division of application No. 09/605,578, filed on Jun. 28, 2000, now Pat. No. 6,389,642.

(51) Int. Cl.[7] .......................... B29C 45/14; H01R 13/58
(52) U.S. Cl. ..................... 264/272.15; 16/2.5; 264/273; 264/279
(58) Field of Search ....................... 264/272.11–272.19, 264/273, 279, 259; 16/2.1, 2.5

(56) References Cited

U.S. PATENT DOCUMENTS

| | | | |
|---|---|---|---|
| 3,439,112 A | 4/1969 | Brown et al. | |
| 3,521,220 A | 7/1970 | Clarke, Jr. et al. | |
| 3,753,214 A | 8/1973 | DuRocher et al. | 339/102 |
| 3,861,778 A | 1/1975 | Capra | 339/103 |
| 4,032,214 A | 6/1977 | McNerney | 339/218 |
| 4,043,630 A | 8/1977 | Suverison et al. | 339/218 |
| 4,314,093 A * | 2/1982 | Eldridge et al. | 174/73.1 |
| 4,718,865 A | 1/1988 | Cordeiro | 439/606 |
| 4,738,636 A | 4/1988 | Bolante | 439/462 |
| 4,912,287 A | 3/1990 | Ono et al. | 174/153 |
| 5,000,695 A | 3/1991 | Nishiyama et al. | 439/276 |
| 5,057,263 A * | 10/1991 | Bengtsson | 264/249 |
| 5,414,218 A | 5/1995 | Nathan | 174/15.1 |
| 5,659,924 A | 8/1997 | Gildersleeve | 16/2.1 |
| 5,735,021 A | 4/1998 | Briggs | 16/369 |
| 5,971,733 A * | 10/1999 | Huang | 425/116 |

FOREIGN PATENT DOCUMENTS

DE 3826474 A1 8/1988

* cited by examiner

*Primary Examiner*—Jill L. Heitbrink
(74) *Attorney, Agent, or Firm*—Derek H. Maughan; Dykas, Shaver & Nipper

(57) ABSTRACT

A strain relief for protection of electrical and other cords extending from a component. The strain relief is made from a hard plug piece which attaches to the case or housing of the component. The cord extends through this plug piece via a passageway. This plug piece has a plurality of holes therethrough which connect the passageway with its outer surface. An molded jacket is molded onto the plug piece, wherein the injected material extends through the holes, into the passageway, and surrounding the cord. The injected material is preferably softer than the material used for the plug piece. The result is a one piece strain relief which is bonded to the cord.

16 Claims, 6 Drawing Sheets

METHOD OF MAKING A STRAIN RELIEF

PRIORITY

This application claims priority from and is a divisional application of the application Ser. No. 09/605,578 filed on Jun. 28, 2000, titled Strain Relief, now U.S. Pat. No. 6,389,642, the disclosure of which is incorporated herein by reference.

DESCRIPTION

BACKGROUND OF THE INVENTION

1. Field of the Invention

The present invention generally relates to electrical cables, and more particularly to electrical cable strain reliefs and methods of manufacture thereof.

2. Background Information

Strain reliefs are used in generally all electrical components which have power cords needing to be plugged into a wall receptacle. These power cords typically extend through an opening in the case or housing of the component. If left unprotected, the power cord would soon fray due to the friction of rubbing against the case opening.

A first purpose of a strain relief is to protect the electrical cord from rubbing against the edges of the opening. A second purpose of a strain relief is to relieve bending strains in the cord as it bends at or near its connection with the opening.

FIG. 1 and FIG. 2 show a common type of prior art strain relief. This type strain relief has a threaded first piece 2 which is typically fastened to the body of the appliance through use of a threaded nut (not shown). This first piece 2 has an extended compression ring through which the wire 5 is inserted. The threaded second piece 4 of the strain relief is then threaded on and compresses the compression ring against the wire. This works reasonably well except in heavy duty applications, such as in commercial vacuum cleaners.

The problem is that as the wire and the threaded strain relief are continuously pulled, twisted and flexed, the compression ring is working fixedly against the power cord, and eventually will start to fray and break the metal strands within the wires within the cord. When this occurs, it will eventually result in a dead short and the heat from the short will melt the threaded strain relief.

A second type of prior art strain relief is used on some lighter duty appliances. These strain reliefs are a single piece which is directly molded on the cord. They are formed by placing the wire cord in a jig, closing up the jig, and injecting PVC to directly bond the strain relief to the outer jacket of the electric cord. However, this is not done with threaded ends because the material is not strong enough to hold a threaded end. This type of direct, injected strain relief is typically used on thin, plastic cases for appliances where the soft cord has a washer-like protrusion on the end which fits into notches between two halves of the case that are then later joined together.

What is needed is a strain relief which overcomes the shortcomings of the prior art. The present invention serves this purpose.

SUMMARY OF THE INVENTION

The present invention is a two-part strain relief. At one end is a threaded end which is hard, preferably glass-filled nylon, which is slid over the cord. The threaded end has two flanges attached to it, and has holes in its shaft so that when direct molded PVC (or other pliable material) is later injected, the PVC will go through the holes and encase the two flanges thereby holding the threaded end tightly bonded to the flexible PVC end.

With this new type of strain relief, there is no compression of the cord, and as a result its life expectancy is significantly greater. The hard threaded end is amenable for use in a variety of applications, from extending through a hole in a metal container, and more importantly, through a hole in a rotational molded container where the thickness of the roto-molded container case wall can vary substantially from part to part, thus necessitating the use of a threaded end.

A first embodiment of the present invention is a method of making a strain relief for protecting a cord extending through the strain relief. This method comprises first inserting the cord through a plug portion. This plug portion having a passageway therethrough extending generally along its axis. This plug portion also has a first end and a second end, with at least one port extending through the plug portion to the passageway near the second end. Second, a mold is placed around at least a portion of the plug portion. Third, a formed piece is created by injecting a plastic material into the mold so as to form a jacket around at least a portion of the plug portion. This jacket covering the second end of the plug portion, and preferably extending through the port(s) into the passageway and around the portion of the cord extending through the portion passageway. It is preferred that the jacket further extending outwards from the second end, parallel to the cord. Finally, the mold would be removed from the formed piece.

A second embodiment of the present invention is an apparatus, namely a strain relief for protecting a cord extending through a housing. This strain relief comprises a plug portion, a fitting portion and a molded jacket. The plug portion has a cord receiving orifice extending therethrough, wherein the cord extends through the cord receiving orifice. The fitting portion is adapted fix the plug portion on a housing. The molded jacket attaches to a portion of the plug portion with a central orifice which surrounds the cord. It is preferred that the plug portion and the fitting portion be threaded. It is preferred that the plug portion comprise at least one port extending from an outside surface of the plug portion to the cord receiving orifice, wherein the molded jacket further extends through the port and into the cord receiving orifice. It is also preferred that the molded jacket comprise a material which is more pliable than the material comprising the plug portion, for instance the molded jacket could be comprised of polyvinyl chloride (PVC) plastic, and the plug portion could be comprised of glass-filled nylon.

A third embodiment of the present invention is an apparatus, namely a strain relief for protecting the cord of an electrical component from fraying and other damage, such an electrical component having a housing through which the cord extends. The strain relief has a generally cylindrical plug portion, an attachment means for attaching said plug portion to said housing, and a jacket molded onto said plug portion. The plug portion has a passageway therethrough extending generally along the axis of the cylindrical plug portion. The plug portion has a first end and a second end. The plug portion contains at least one port extending from an exterior surface of the plug portion to the passageway near the second end. The jacket covers the plug portion second end, extending through the ports, into the passageway, and around the cord extending through the plug portion passageway. The jacket further extends outwards from the second end, parallel to the cord. It is preferred that the first end be threaded, and that the attachment means be a threaded nut. It is preferred that the plug portion further comprise at least one protuberance extending out from the plug portion near the second end. One type of such a protuberance comprises at least one retainer band circumscribing the plug portion near the second end, the molded jacket molded around the band. It is also preferred that the molded jacket comprise a material which is more pliable than the material comprising the plug portion, for instance, the molded jacket could be comprised of polyvinyl chloride (PVC) plastic, and the plug portion could be comprised of glass filled nylon.

In a fourth embodiment, the apparatus is a strain relief for protecting the cord of an electrical component from fraying, such an electrical component having a housing through which the cord extends. In such an embodiment, the strain relief would comprise an elongated plug portion, a threaded fitting and a jacket molded onto said plug portion. The preferred plug portion having a passageway extending longitudinally therethrough. The plug portion having a first end and a second end, wherein the first end is threaded, and wherein at least one retainer band circumscribes the plug portion near the second end. The threaded fitting being adapted to thread onto the plug portion at the plug portion first end. The jacket covering the plug portion second end, said jacket further encasing the retainer band. The jacket further extending outwards from the second end, parallel to the cord, and defining a passage for the cord and surrounding the cord. It is also preferred that the molded jacket comprise a material which is more pliable than the material comprising the plug portion, for instance the molded jacket could be comprised of polyvinyl chloride (PVC) plastic, and the plug portion could be glass filled nylon.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
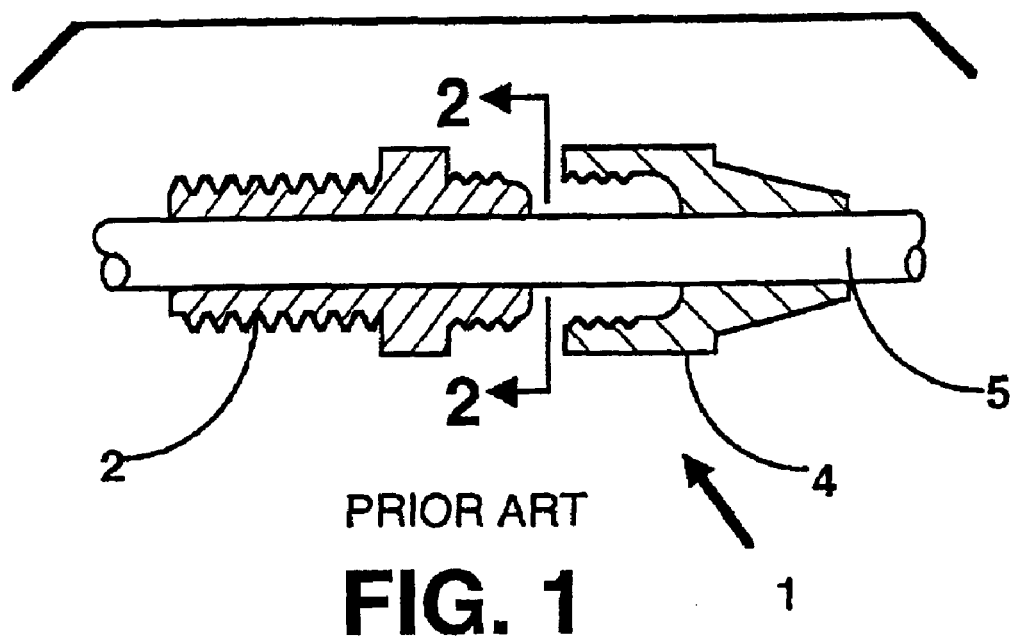
FIG. 1 (PRIOR ART) is a cross-sectional view of one type of prior art strain relief.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
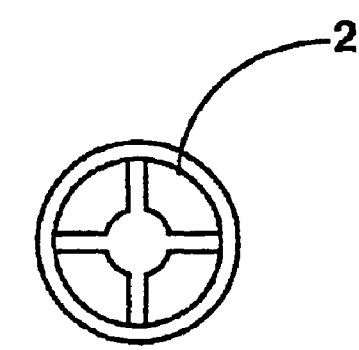
FIG. 2 (PRIOR ART) is a partial end view of FIG. 1.

FIGS. 1 and 2 show prior art strain reliefs which are discussed above in the Background Information section of the Background of the Invention.

Figure 3:
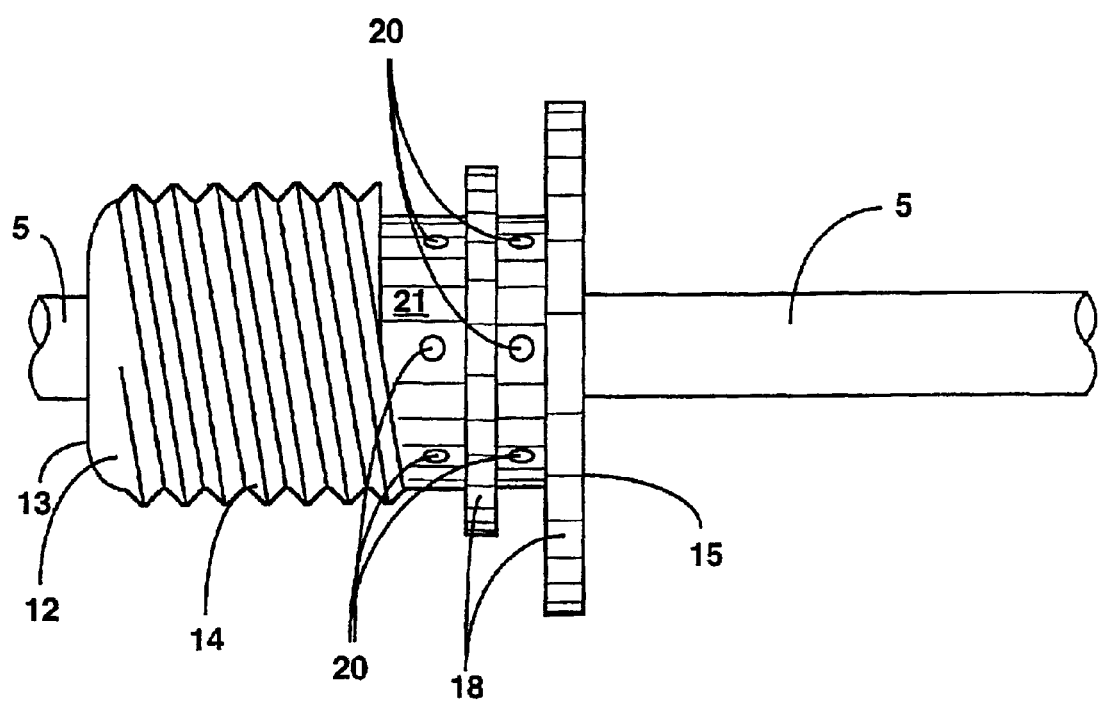
FIG. 3 is a side view of the plug portion of the new strain relief.

Referring initially to FIG. 3, shown is the plug portion 12 of the present invention. In this embodiment, the plug portion 12 comprises a generally elongate cylinder having a passageway therethrough for receiving a cord 5. The term "cord" is not intended to be limiting to only "electrical cords" but to include all other objects common utilized with strain reliefs and is also intended to include other applications, such as the protection of pneumatic and hydraulic hoses. The plug portion 12 has a first end 13 and a second end 15. The first end 13 is threaded, having a threaded portion 14 for cooperating with an attachment means, such as a fitting or nut. The attachment means is used to attach the plug portion 12 of the present invention to a housing or other rigid structure. The attachment means can be any type known to the industry, including, but not limited to threaded nuts, pins, screws, adhesives, melting, clamps, and other types of fittings.

The plug portion 12 additionally has a plurality of ports 20 extending from the exterior surface 21 of the plug portion 12 to the passageway extending through the plug portion 12 which receives the cord 5. These ports 20 are preferably nearer the second end 15 than the first end 13.

The plug portion 12 also preferably contains at least one retainer band 18 or other protuberance from its exterior surface for securing the plug portion 12 in the molded jacket described infra. In the embodiment shown, a pair of retainer bands or flanges 18 can be found circumscribing the plug portion 12 near the second end 15.

It is preferred that the plug portion 12 of the present invention be separately molded from a hard material, such as glass-filled nylon. The plug portion 12 is then fitted on the cord 5 by inserting one end of the cord 5 into one of the ends of the passageway of the plug portion 12, and extending the cord 5 therethrough.

Figure 4:
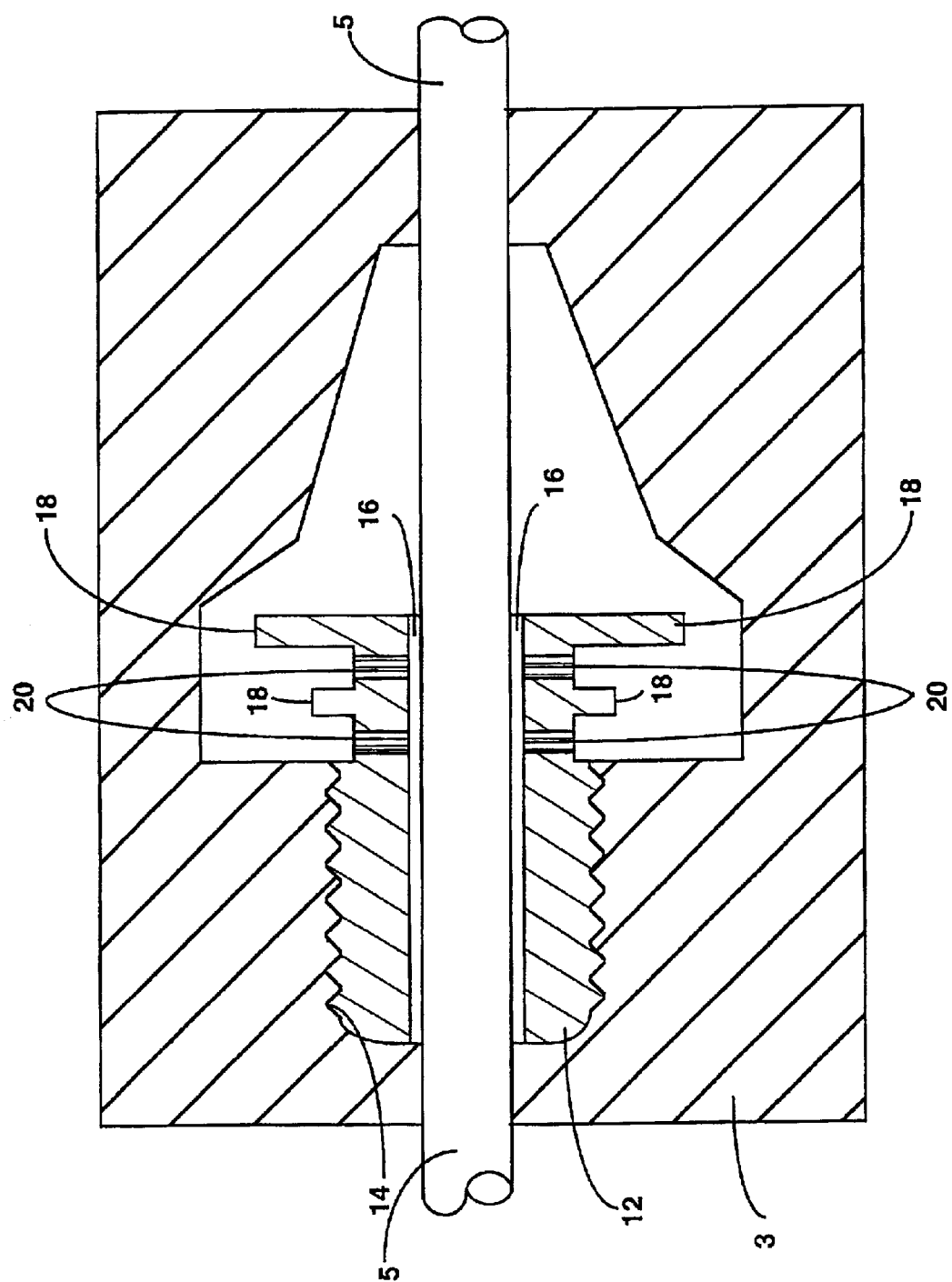
FIG. 4 is a side, cross-sectional view of the new strain relief plug and wire held in a mold.
Figure 5:
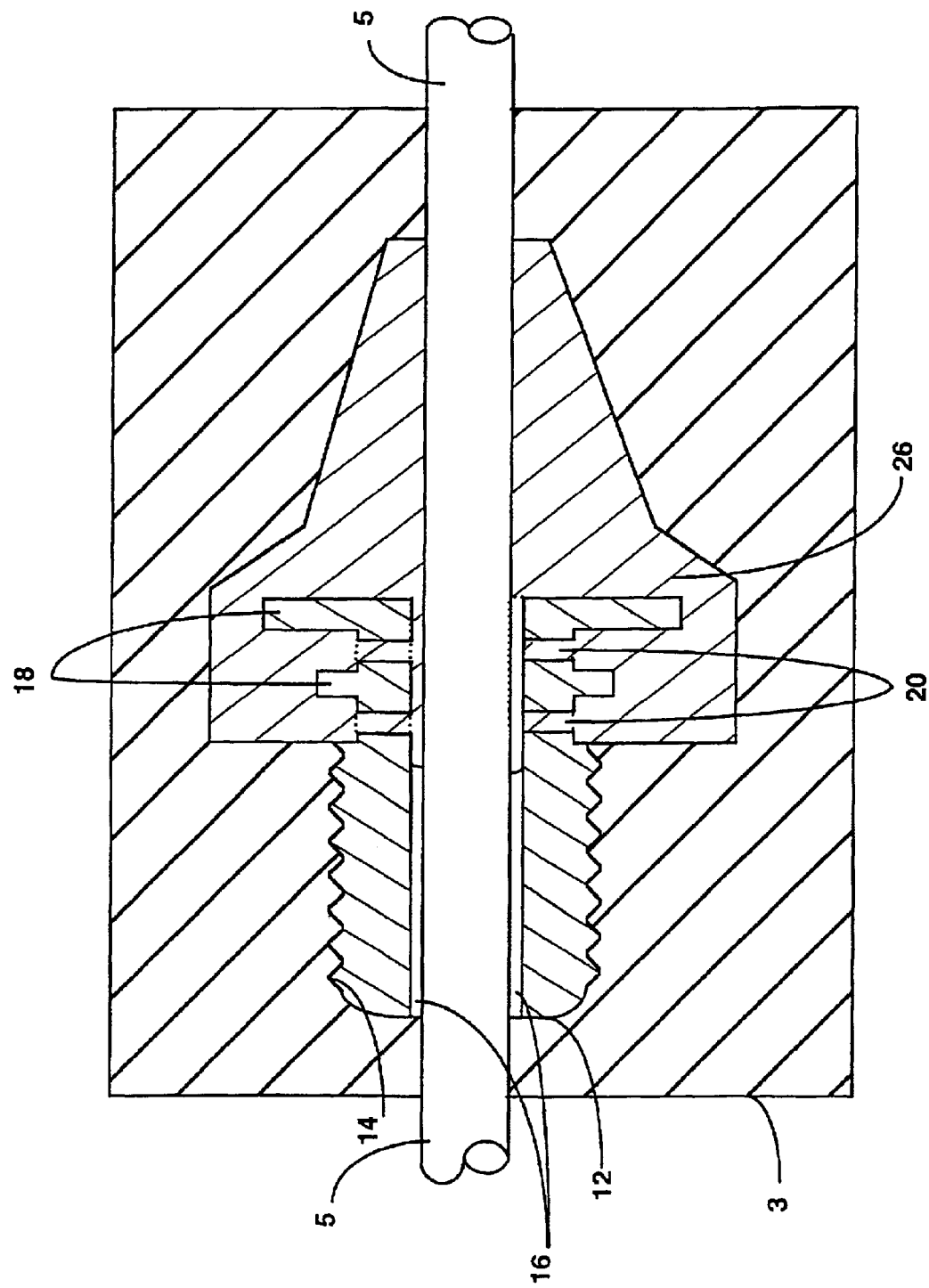
FIG. 5 is a side, cross-sectional view of the new strain relief held in a mold with a molded jacket formed.

Now referring to FIGS. 4 and 5, to manufacture the present invention, first, one of the plug portions 12 having the cord 5 extending through the passageway 16, is inserted into a mold of jig 3. This mold may be threaded so as to receive threads of the plug portion 12, if the plug portion 12 has threads. This figure shows the ports 20 extending through the plug portion 12, opening up into the passageway 16. The passageway 16 is preferably slightly larger in diameter than the cord 5 so that a gap remains between the cord 5 and the side walls of the passageway 16.

FIG. 5 shows the molded jacket 26 in place after an injected material has been injected into the mold 3. The preferred matter of composition of the molded jacket 26 is polyvinyl chloride (PVC), however other materials may also be used. It is preferred that the material used for the molded jacket 26 be more flexible than the material used for the plug portion 12. This figure particularly shows how the injected material is able to travel through the ports 20 and into the passageway 16. In such a manner, the injected material surrounds the cord 5 in at least a portion of the passageway. The injected material furthermore encases the retainer bands 18, thereby fixedly attaching the jacket 26 to the plug 12.

Figure 6:
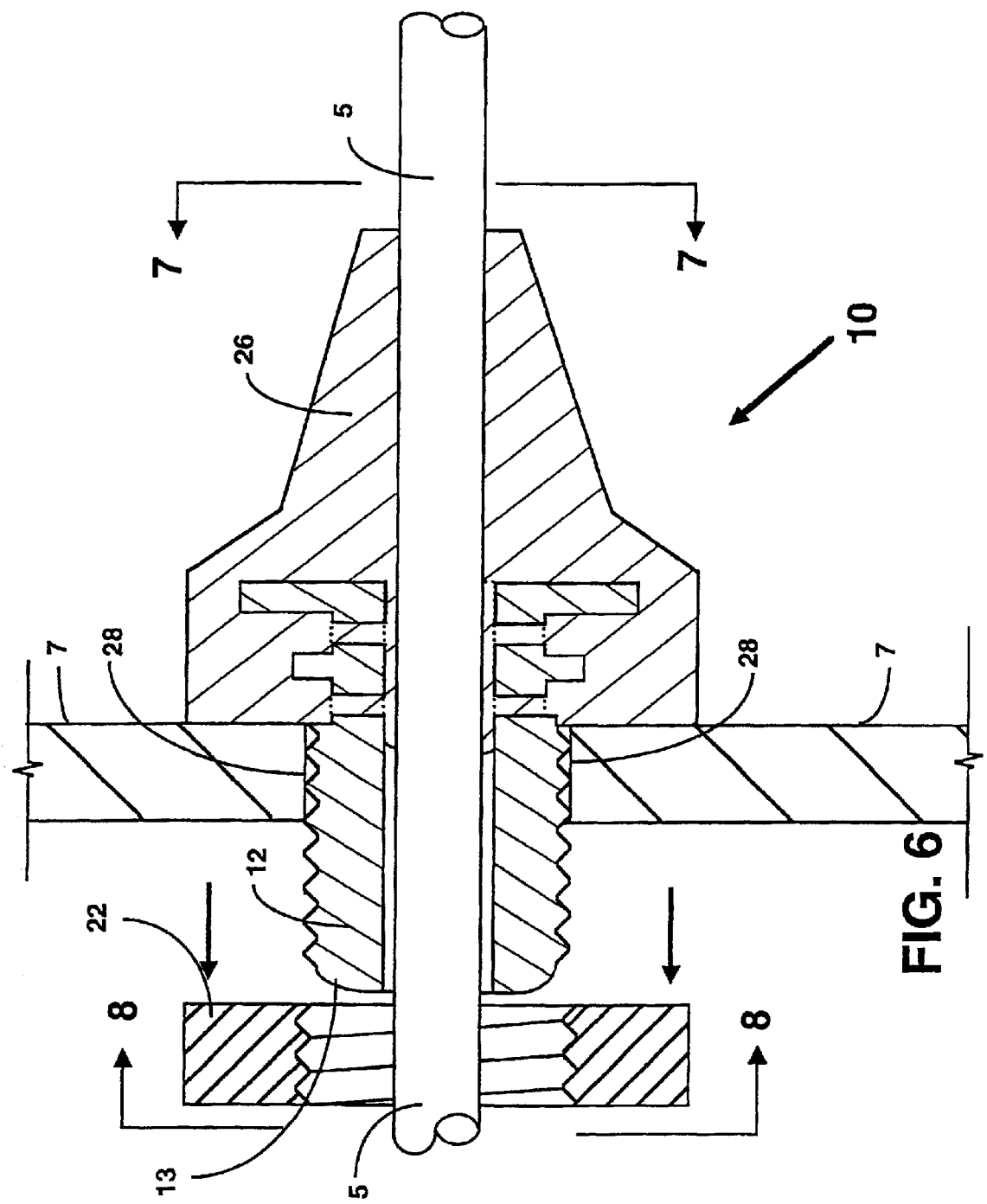
FIG. 6 is a side, cross-sectional view of the fully formed strain relief.

Referring now to FIG. 6, the present invention 10 has been removed from the mold of FIGS. 4 and 5, and the first end 13 of the plug portion 12 has been inserted through the cord hole 28 of the component housing 7. In such a manner, the first end 13 can be secured to the housing through a fitting 22, such as the nut shown, or by other means.

Figure 7:
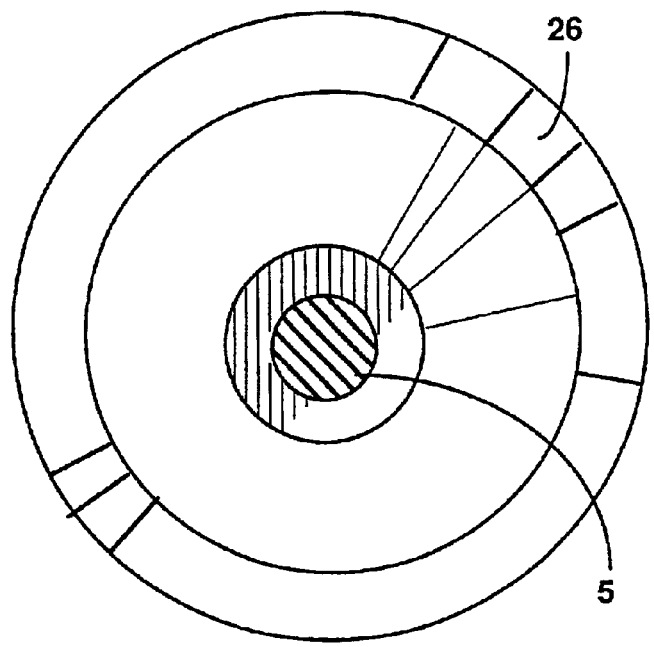
FIG. 7 is a first end view taken along the plane 7—7 of FIG. 6.
Figure 8:
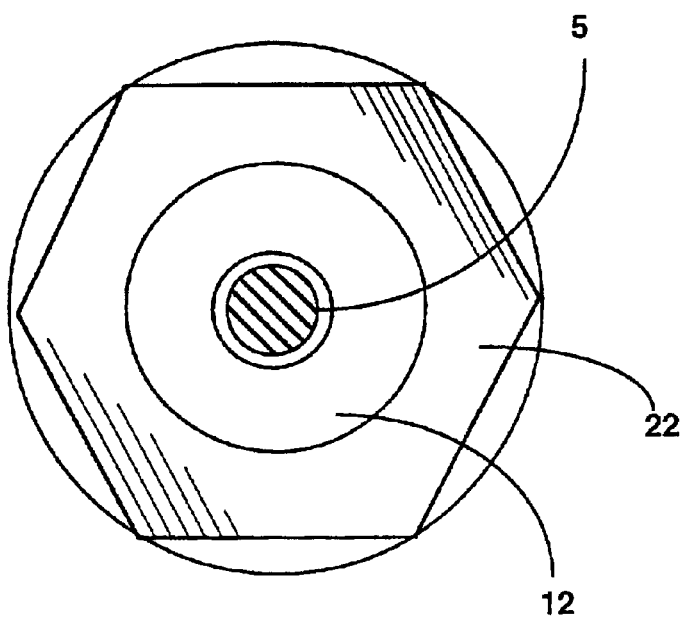
FIG. 8 is a second end view taken along the plane 8—8 of FIG. 6.

FIG. 7 and FIG. 8 show end views of the embodiment of FIG. 6.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A method of making a strain relief for a cord extending through said strain relief, said method comprising the steps of:

inserting said cord within a generally cylindrical plug portion, said plug portion having a first end and a second end and defining a passageway extending from said first end to said second end through said cylindrical plug portion, said plug portion further defining a plurality of ports extending axially through said generally cylindrical plug portion to said passageway near said second end;

placing a mold around said plug portion;

injecting a plastic material into said mold so as to form a jacket, said jacket covering said plug portion second end, and extending through said ports into said passageway, and around said cord within said plug portion passageway, said jacket further extending outwards from said second end, parallel to said cord; and separating said mold from said formed piece.

2. The method of claim 1, wherein said molded jacket is made of a material which is more pliable than the material from which said plug portion is made.

3. The strain relief of claim 2, wherein said molded jacket is made of polyvinyl chloride (PVC) plastic, and said plug portion is made of glass-filled nylon.

4. A method of making a strain relief for protecting a cord extending through said strain relief, said cord having a first end, wherein said method of making a strain relief comprises:

providing a plug portion having a first end and a second end aligned along a longitudinal axis, said plug portion further defining a passageway extendinng from said first end to said second end along a longitudinal axis, said plug portion further having at least one flange positioned adjacent said second end; said plug portion further defining a plurality of ports extending through said plug portion to said passageway;

inserting said cord first end through said passageway;

placing a mold around at least a portion of said plug portion;

creating a formed piece by injecting a plastic material into said mold so as to form a jacket around said plug portion, said plastic material covering said plug portion second end, said plastic material further engaging said flange, said plastic material also passing through said ports into said passageway and extending outwards from said plug second end, parallel to said cord; and removing said mold.

5. A method of making a strain relief for protecting a cord extending through said strain relief, in which the method of making said strain relief comprises the steps of:

installing a plug piece on a cord, said plug piece comprising a plug piece body, with a first end and a second end, said plug piece body defining a longitudinal cord passageway which extends through said first end and said second end of said plug piece, said plug piece body also defining a plurality of ports, said ports extending through said body to said passageway;

positioning said cord in said longitudinal cord passageway of said plug piece body; and forming a yielding formed jacket around said cord and around at least a portion of said second end of said plug piece, by injecting a yielding material into said ports of said plug piece, said yielding material passing through said ports and forming a yielding jacket around said cord within said passageway and at least a portion of said second end of said plug piece, said yielding formed jacket is more flexible than said plug piece, and in which said first end of said plug piece may be attached to a cord origination point.

6. The method of claim 5 wherein said plug piece is formed around a cord in an injection mold.

7. The method of claim 5 wherein said plug piece is plastic and said yield formed piece is a material more pliable than the plastic of said plug piece.

8. The method of claim 5 wherein said yielding plug piece first end is threaded and attached to a cord origination point with a corresponding nut fitting.

9. The method of claim 5 wherein said yielding plug piece first end is configured to snap in place with a corresponding fitting portion.

10. The method of claim 5 wherein said cord is and electrical cord with wires inside an insulating sheath.

11. The method of claim 5 wherein said cord is a conduit.

12. The method of claim 5 wherein said plug is formed by stereo lithography.

13. The method of claim 5 wherein said cord is a flexible conduit.

14. The method of claim 13 wherein said conduit is a hose for liquids.

15. The method of claim 13 wherein said conduit is a hose for gasses.

16. The method of claim 13 wherein said conduit and strain relief are adapted to carry contents under pressure.

* * * * *